(12) United States Patent
Maruyama (10) Patent No.: US 12,043,230 B2
(45) Date of Patent: Jul. 23, 2024

(54) VEHICLE BRAKE DEVICE

(71) Applicant: ADVICS CO., LTD., Kariya (JP)

(72) Inventor: Masaki Maruyama, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/310,298

(22) PCT Filed: Jan. 27, 2020

(86) PCT No.: PCT/JP2020/002718
§ 371 (c)(1),
(2) Date: Jul. 27, 2021

(87) PCT Pub. No.: WO2020/158649
PCT Pub. Date: Aug. 6, 2020

(65) Prior Publication Data
US 2024/0025388 A1    Jan. 25, 2024

(30) Foreign Application Priority Data
Jan. 28, 2019   (JP) .................................. 2019-012019

(51) Int. Cl.
*B60T 13/74*    (2006.01)
(52) U.S. Cl.
CPC .................................. *B60T 13/741* (2013.01)
(58) Field of Classification Search
None
See application file for complete search history.

(56) References Cited

U.S. PATENT DOCUMENTS

| | | | |
|---|---|---|---|
| 2007/0132312 A1* | 6/2007 | Ajiro | B60T 8/4081 303/178 |
| 2013/0289845 A1* | 10/2013 | Ajiro | B60T 13/745 701/70 |
| 2015/0123457 A1* | 5/2015 | Naito | B60L 50/16 303/3 |
| 2016/0200199 A1* | 7/2016 | Nakata | B60T 13/586 303/3 |
| 2016/0325628 A1* | 11/2016 | Okano | B60T 7/042 |
| 2018/0201240 A1* | 7/2018 | Masuda | B60T 13/74 |
| 2019/0061532 A1* | 2/2019 | Maruyama | B60T 7/042 |

FOREIGN PATENT DOCUMENTS

JP    2009029173 A    2/2009
JP    2012086674 A    5/2012

OTHER PUBLICATIONS

International Search Report (PCT/ISA/210) with translation and Written Opinion (PCT/ISA/237) mailed on Mar. 17, 2020, by the Japanese Patent Office as the International Searching Authority for International Application No. PCT/JP2020/002718.

* cited by examiner

*Primary Examiner* — Ryan Rink
(74) *Attorney, Agent, or Firm* — BUCHANAN, INGERSOLL & ROONEY PC (57) ABSTRACT

A brake control device forming a brake device includes an acquisition unit acquiring an operation value which is a value relating to an operation of a brake pedal in each control cycle, a target derivation unit deriving a final target braking power BPTrF which is a target of a braking power at a point in time when a prescribed time passes from a start of the operation of the brake pedal based on an increase state of the operation value when the operation of the brake pedal is started, and a brake controller increasing a vehicle braking power BP toward the final target braking power BPTrF.

3 Claims, 5 Drawing Sheets

OPERATING FORCE

FIG. 7B

STROKE AMOUNT

FIG. 7C

TARGET BRAKING POWER

VEHICLE BRAKE DEVICE

TECHNICAL FIELD

The present disclosure relates to a vehicle brake device adjusting a braking power in accordance with a braking operation by a driver of a vehicle.

BACKGROUND ART

In Patent Literature 1, there is described an example of a vehicle brake control device setting a target braking power based on a pedal pressure by the driver of the vehicle and a stroke amount of a brake pedal. The pedal pressure is a sensor value based on a detection signal from a pedal-pressure sensor, and the stroke amount is a sensor value based on a detection signal from a stroke sensor.

In the device described in PTL 1, a first target braking power is derived so that a value becomes large as the pedal pressure increases, and a second target braking power is derived so that a value becomes large as the stroke amount increases. Then, a final target braking power is derived based on the first target braking power and the second target braking power. A brake actuator is controlled so that the braking power is approximated to the final target braking power. The final target braking power is updated in each prescribed control cycle in the device described in PTL 1.

CITATION LIST

Patent Literature

PTL 1: JP-A-2012-86674

SUMMARY

Technical Problem

When the driver operates a braking operation member such as the brake pedal, there may occur a phenomenon that an operating force corresponding to the pedal pressure which is the sensor value decreases even when the stroke amount of the braking operation member increases. Such phenomenon tends to occur when the driver needs sudden braking. When the above phenomenon occurs, the target braking power may be decreased in the device that sets the target braking power based on the operating force though the driver does not require the decrease in vehicle braking power. If the vehicle braking power is decreased in accordance with the decrease of the target braking power, the driver may feel uncomfortable.

Solution to Problem

A vehicle brake device for solving the above problems includes an acquisition unit acquiring an operation value which is a value relating to an operation of a braking operation member of a vehicle in each control cycle, a target derivation unit deriving a final target braking power which is a target of a braking power at a point in time when a prescribed time longer than the control cycle passes from a start of the operation of the braking operation member based on an increase state of the operation value when the operation of the braking operation member is started, and a brake controller increasing the vehicle braking power toward the final target braking power.

According to the above configuration, when the operation of the braking operation member is started, the final target braking power which is the target of the braking power at the point in time when the prescribed time passes from the start of the operation of the braking operation member is derived based on the increase state of the operation value obtained when the operation is started. Then, the vehicle braking power is increased toward the final target braking power for the prescribed time. Accordingly, in a period from the start of the operation of the braking operation member to the point in time when the prescribed time passes, even when a phenomenon that the operation value decreases though the driver does not require the decrease in the vehicle braking power occurs, it is possible to suppress the decrease in the vehicle braking power against the intention of the driver. Therefore, it is possible to suppress the decrease in the vehicle braking power against the intention of the driver while the braking operation is executed and to suppress uncomfortable feeling given to the driver according to the above configuration.

DESCRIPTION OF EMBODIMENTS

Hereinafter, a vehicle brake device according to an embodiment will be explained with reference to FIG. 1 to FIGS. 7A to 7C.

Figure 1:
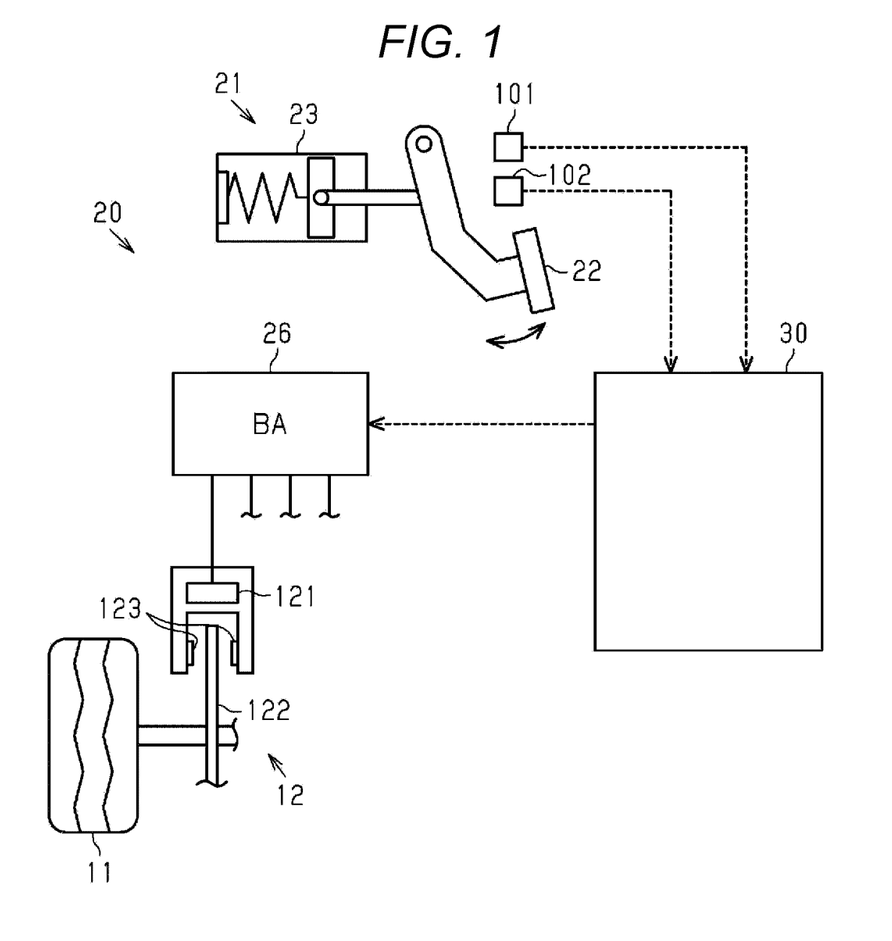
FIG. 1 is a configuration diagram illustrating an outline of a vehicle brake device according to an embodiment.

A vehicle including a brake device 20 according to the embodiment is illustrated in FIG. 1. A braking power is given to a wheel 11 of the vehicle by operation of a brake mechanism 12. The brake mechanism 12 is configured so that a force of pressing friction materials 123 onto a rotating body 122 integrally rotating with the wheel 11 becomes large as a WC pressure PWC which is a hydraulic pressure inside a wheel cylinder 121 increases. That is, the brake mechanism 12 can give a higher braking power to the wheel 11 as the WC pressure PWC increases.

The brake device 20 includes a hydraulic pressure generator 21, a brake actuator 26, and a brake control device 30. The hydraulic pressure generator 21 has a brake pedal 22 as an example of a braking operation member, and a master cylinder 23 generating a hydraulic pressure corresponding to the operation of the brake pedal 22 by a driver of the vehicle. The brake actuator 26 controls a vehicle braking power BP through adjustment of the WC pressure PWC inside the wheel cylinder 121. The vehicle braking power BP means a sum total of the braking power given to a plurality of wheels 11.

The brake control device 30 controls the operation of the brake actuator 26. Detection signals from various sensors are inputted to the brake control device 30. For example, an operating force sensor 101 and a stroke sensor 102 can be cited as the above sensors. The operating force sensor 101 detects an operating force PF to be inputted to the brake pedal 22 and outputs a detection signal corresponding to the detected operating force PF. The operating force PF is, for example, a pedal pressure inputted to the brake pedal 22. The stroke sensor 102 detects a stroke amount SS of the brake pedal 22 as an example of an operation amount of the braking operation member, and outputs a detection signal corresponding to the detected stroke amount SS. The operating force PF and the stroke amount SS are examples of operation values as values relating to the operation of the braking operation member. That is, the operating force sensor 101 and the stroke sensor 102 are examples of an "operation value sensor" detecting the operation value. The stroke amount SS is also an operation amount; therefore, the stroke sensor 102 is also an example of an "operation amount sensor" for detecting an operation amount.

The brake control device 30 sets a target braking power BPTr as a target of the vehicle braking power based on the operating force PF and the stroke amount SS. Then, The brake control device 30 controls the brake actuator 26 based on the set target braking power BPTr.

Figure 2:
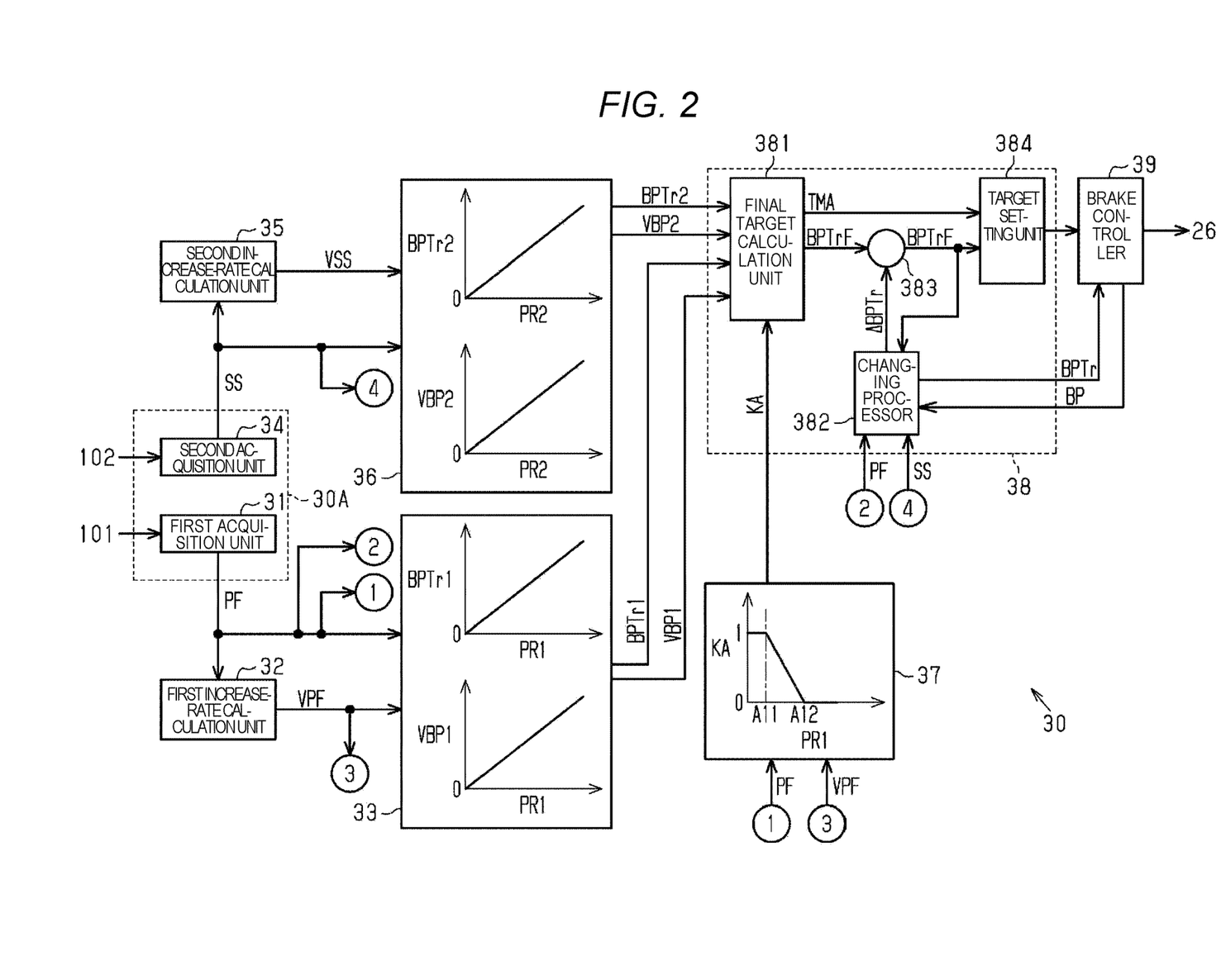
FIG. 2 is a block diagram illustrating a functional configuration of a brake control device of the brake device.

As illustrated in FIG. 2, the brake control device 30 includes a first acquisition unit 31, a first increase-rate calculation unit 32, a first reference target derivation unit 33, a second acquisition unit 34, a second increase-rate calculation unit 35, a second reference target derivation unit 36, a coefficient derivation unit 37, a target derivation unit 38, and a brake controller 39 as functional units. In the embodiment, an "acquisition unit 30A" acquiring operation values in each prescribed control cycle is formed by the first acquisition unit 31 and the second acquisition unit 34.

The first acquisition unit 31 acquires the operating force PF calculated based on the detection signal from the operating force sensor 101. The operating force PF acquired by the first acquisition unit 31 is a sensor value. The first acquisition unit 31 acquires the operating force PF in each prescribed control cycle.

The first increase-rate calculation unit 32 calculates an operating-force increase rate VPF which is an increase rate of the operating force PF when a braking operation by the driver is started. For example, the first increase-rate calculation unit 32 derives the operating-force increase rate VPF by time-differentiating the operating force PF obtained when the braking operation is started.

The first reference target derivation unit 33 derives a first target braking power BPTr1 and a first target increase rate VBP1 based on an increase state of the operating force PF when the braking operation is started. In the embodiment, the first reference target derivation unit 33 calculates a product of the operating force PF and the operating-force increase rate VPF as the increase state of the operating force PF, and derives the first target braking power BPTr1 and the first target increase rate VBP1 based on the product. The product of the operating force PF and the operating-force increase rate VPF may be referred to as a "first product PR1" in the following description. That is, the first product PR1 is an example of an "increase state of the operation value".

The first reference target derivation unit 33 derives the first target braking power BPTr1 so that a value becomes large as the first product PR1 increases. The first reference target derivation unit 33 also derives the first target increase rate VBP1 so that a value becomes large as the first product PR1 increases.

The second acquisition unit 34 acquires the stroke amount SS calculated based on the detection signal from the stroke sensor 102. The stroke amount SS acquired by the second acquisition unit 34 is a sensor value. The second acquisition unit 34 acquires the stroke amount SS in each control cycle described above.

The second increase-rate calculation unit 35 calculates a stroke-amount increase rate VSS which is an increase rate of the stroke amount SS when the braking operation by the driver is started. For example, the second increase-rate calculation unit 35 derives the stroke-amount increase rate VSS by time-differentiating the stroke amount SS obtained when the braking operation is started.

The second reference target derivation unit 36 derives a second target braking power BPTr2 and a second target increase rate VBP2 based on an increase state of the stroke amount SS when the braking operation is started. In the embodiment, the second reference target derivation unit 36 calculates a product of the stroke amount SS and the stroke-amount increase rate VSS as the increase state of the stroke amount SS, and derives the second target braking power BPTr2 and the second target increase rate VBP2 based on the product. The product of the stroke amount SS and the stroke-amount increase rate VSS may be referred to as a "second product PR2" in the following description.

The second reference target derivation unit 36 derives the second target braking power BPTr2 so that a value becomes large as the second product PR2 increases. The second reference target derivation unit 36 also derives the second target increase rate VBP2 so that a value becomes large as the second product PR2 increases.

The coefficient derivation unit 37 derives a coefficient KA based on the increase state of the operating force PF when the braking operation is started. That is, the coefficient derivation unit 37 calculates the first product PR1 which is the product of the operating force PF and the operating-force increase rate VPF obtained when the braking operation is started as the increase state of the operating force PF. The coefficient derivation unit 37 sets the coefficient KA to "1" when the first product PR1 is smaller than a 11th value A11, and sets the coefficient KA to "0" when the first product PR1 is equal to or larger than a 12th value A12. The coefficient derivation unit 37 sets the coefficient KA to be decreased as the first product PR1 is increased when the first product PR1 is equal to or larger than the 11th value A11 and smaller than the 12th value A12.

The target derivation unit 38 derives a prescribed time TMA and a final target braking power BPTrF which is a target braking power at a point in time when the prescribed time TMA passes from the start of the braking operation based on the increase state of the operating force PF and the increase state of the stroke amount SS obtained when the braking operation is started. The prescribed time TMA is a time longer than the control cycle as the acquisition cycle of the operating force PF and the stroke amount SS. The target derivation unit 38 includes a final target calculation unit 381, a changing processor 382, a calculator 383, and a target setting unit 384.

The final target calculation unit 381 derives the final target braking power BPTrF when the braking operation is started. That is, the final target calculation unit 381 calculates the final target braking power BPTrF by using the following relational expression (expression 1). According to the expression, the larger the first product PR1 obtained when the braking operation is started is, the higher the final target braking power BPTrF becomes. Moreover, the larger the second product PR2 obtained when the braking operation is started is, the higher the final target braking power BPTrF becomes.

$$BPTrF = KA \cdot BPTr2 + (1-KA) \cdot BPTr1 \qquad \text{(Expression 1)}$$

The final target calculation unit 381 calculates the prescribed time TMA using the following relational expressions (Expression 2) and (Expression 3) when the braking operation is started. In the relational expressions (Expression 2) and (Expression 3), "VBP" represents a target increase rate which is a target of the increase rate of the braking power BP. According to the expressions, the larger the first product PR1 obtained when the braking operation is started is, the higher the target increase rate VBP becomes. Moreover, the larger the second product PR2 obtained when the braking operation is started is, the higher the target increase rate VBP becomes. Then, the prescribed time TMA can be derived by dividing the final target braking power BPTrF by the target increase rate VBP. That is, the larger the first product PR1 obtained when the braking operation is started is, the shorter the prescribed time TMA becomes. Moreover, the larger the second product PR2 obtained when the braking operation is started is, the shorter the prescribed time TMA becomes.

$$VBP = KA \cdot VBP2 + (1-KA) \cdot VBP1 \qquad \text{(Expression 2)}$$

$$TMA = BPTrF/VBP \qquad \text{(Expression 3)}$$

When the vehicle braking power BP increases toward the final target braking power BPTrF, the changing processor 382 derived a target correction amount ΔBPTr based on the stroke amount SS acquired by the second acquisition unit 34. The target correction amount ΔBPTr is a correction amount for correcting the prescribed target braking power BPTr. A specific method for deriving the target correction amount ΔBPTr will be described later.

The changing processor 382 adjusts the target braking power BPTr based on the operating force PF acquired by the first acquisition unit 31 after the vehicle braking power BP reaches the final target braking power BPTrF. A specific method of adjusting the target braking power BPTr will be described later.

The calculator 383 calculates a value obtained by subtracting the target correction amount ΔBPTr derived by the changing processor 382 from the final target braking power BPTrF calculated by the final target calculation unit 381 as the final target braking power BPTrF.

The target setting unit 384 sets the target braking power BPTr based on the prescribed time TMA calculated by the final target calculation unit 381 and the final target braking power BPTrF calculated by the calculator 383. The setting of the target braking power BPTr based on the prescribed time TMA and the final target braking power BPTrF will be described later.

The brake controller 39 controls the operation of the brake actuator 26 based on the target braking power BPTr derived by the target setting unit 384 or the changing processor 382 in the target derivation unit 38. That is, the vehicle braking power BP is controlled based on the target braking power BPTr. Accordingly, the vehicle braking power BP can be changed in accordance with variation of the target braking power BPTr.

Figure 3:
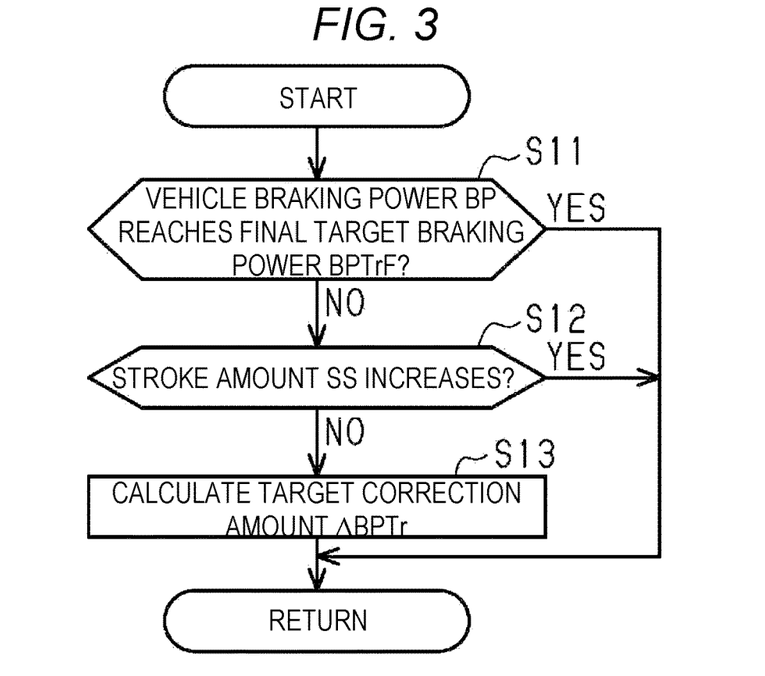
FIG. 3 is a flowchart for explaining a processing routine executed by the brake control device.

Next, a processing routine executed by the changing processor 382 for deriving the target correction amount ΔBPTr will be explained with reference to FIG. 3. The processing routine is repeatedly executed at the time of the braking operation by the driver.

In the processing routine, the changing processor 382 determines whether the vehicle braking power BP reaches the final target braking power BPTrF or not (S11). The final target braking power BPTrF in this case means the final target braking power BPTrF calculated by the calculator 383. When it is determined that the vehicle braking power BP reaches the final target braking power BPTrF (S11: YES), the changing processor 382 ends the processing routine once. On the other hand, when it is not determined that the vehicle braking power BP reaches the final target braking power BPTrF (S11: NO), the changing processor 382 determines whether the stroke amount SS increases or not (S12). When it is determined that the stroke amount SS increases (S12: YES), the changing processor 382 ends the processing routine once. That is, when the stroke amount SS increases under a state where the vehicle braking power BP has not reached the final target braking power BPTrF yet, the final target braking power BPTrF calculated by the final target calculation unit 381 is not decreased. In this case, the target correction amount ΔBPTr will be "0".

On the other hand, when it is not determined that the stroke amount SS increases (S12: NO), the changing processor 382 sets the target correction amount ΔBPTr to a value larger than "0" (S13). Specifically, the changing processor 382 calculates the target correction amount ΔBPTr so that a value becomes large as a difference between the vehicle braking power BP at the moment and the final target braking power BPTrF increases when the stroke amount SS is held. The changing processor 382 calculates the target correction amount ΔBPTr so that the value becomes large as compared with a case where the stroke amount SS is held when the stroke amount SS decreases. After the target correction amount ΔBPTr is calculated as described above, the changing processor 382 ends the processing routine once.

When the target correction amount ΔBPTr is a value larger than "0", the final target braking power BPTrF calculated by the final target calculation unit 381 is decreased by the calculator 383 and inputted to the target setting unit 384. That is, the target derivation unit 38 can also execute decreasing processing that decreases the final target braking power BPTrF when the stroke amount SS is held or decreased while the vehicle braking power BP increases toward the final target braking power BPTrF in the embodiment.

Next, a processing routine executed by the changing processor 382 for adjusting the target braking power BPTr after the vehicle braking power BP reaches the final target braking power BPTrF will be explained with reference to FIG. 4.

In the processing routine, the changing processor 382 determines whether the vehicle braking power BP reaches the final target braking power BPTrF or not (S21). The final target braking power BPTrF in this case means the final target braking power BPTrF calculated by the calculator 383. When it is not determined that the vehicle braking power BP reaches the final target braking power BPTrF (S21: NO), the changing processor 382 ends the processing routine once. In this case, the target braking power BPTr is not changed by the changing processor 382.

On the other hand, when it is determined that the vehicle braking power BP reaches the final target braking power BPTrF (S21: YES), the changing processor 382 determines whether the operating force PF is changed or not (S22). When the operating force PF is not changed, namely, when the operating force PF is held, it can be determined that the driver does not desire further increase in the vehicle braking power BP or decrease in the braking power. On the other hand, when the operating force PF is increased, it can be determined that the driver desires to increase the vehicle braking power BP to be higher than the final target braking power BPTrF. When the operating force PF is decreased, it can be determined that the driver desires to decrease the vehicle braking power BP.

In Step S22, when it is not determined that the operating force PF is changed (NO), the changing processor 382 ends the processing routine once. In this case, the target braking power BPTr is not changed by the changing processor 382. On the other hand, when it is determined that the operating force PF is changed (S22: YES), the changing processor 382 executes changing processing that changes the target braking power BPTr (S23). The changing processor 382 increases the target braking power BPTr when the operating force PF is increased in the changing processing. On the other hand, the changing processor 382 decreases the target braking power BPTr when the operating force PF is decreased in the changing processing. After the changing processing is executed as described above, the changing processor 382 ends the processing routine once.

Figure 4:
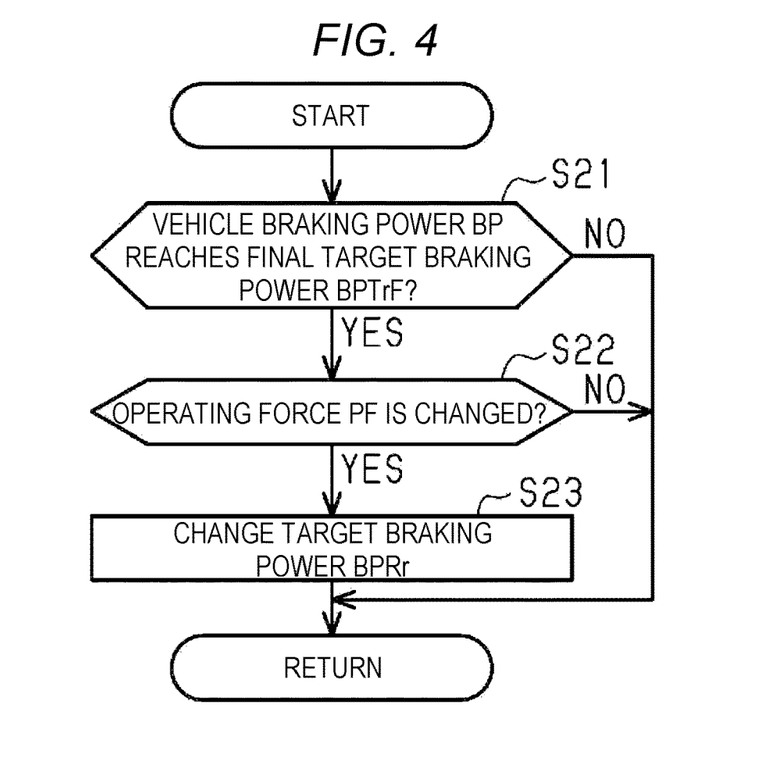
FIG. 4 is a flowchart for explaining a processing routine executed by the brake control device.

The processing routine illustrated in FIG. 4 is repeatedly executed in a cycle shorter than the prescribed time TMA. Accordingly, in the case where Step S23 is executed, the target braking power BPTr is set in each period of time shorter than the prescribed time TMA by the changing processor 382. In the case where Step S23 is executed, a cycle of starting execution of the processing routine, namely, a cycle of setting the target braking power BPTr may be the same period of time as the above control cycle as well as longer than the control cycle as long as the cycle is shorter than the prescribed time TMA. The cycle of starting execution of the processing routine, namely, the cycle of setting the target braking power BPTr may become shorter as the number of times that determination whether the operating force PF is changed or not is made increases.

Next, processing executed by the target setting unit 384 for setting the target braking power BPTr based on the prescribed time TMA and the final target braking power BPTrF will be explained with reference to FIG. 5.

When the braking operation is started by the driver, the prescribed time TMA is derived by the final target calculation unit 381, and the final target braking power BPTrF is derived by the calculator 383, the target setting unit 384 creates a changing profile BPPr of the target braking power BPTr from the start of the braking operation to a point in time when the prescribed time TMA passes. The changing profile BPPr is a transition of the target braking power BPTr in each period of time shorter than the prescribed time TMA. For example, the changing profile BPPr is a transition of the target braking power BPTr in each control cycle.

Figure 5:
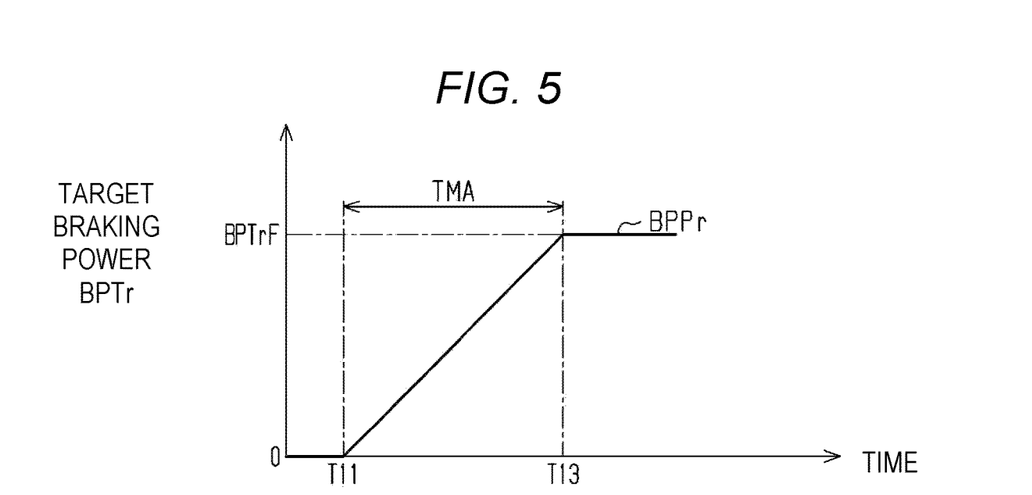
FIG. 5 is a graph illustrating an example of a changing profile of a target braking power from a start point in time of a braking operation until a prescribed time passes.

FIG. 5 illustrates an example of the changing profile BPPr. According to the changing profile BPPr, the target braking power BPTr at a start point in time T11 of the braking operation is set to "0". The target braking power BPTr at a prescribed point in time T13 which is a point in time when the prescribed time TMA passes from the start point in time T11 is set to the same value as the final target braking power BPTrF. Then, the target braking power BPTr is set so that the value becomes large as the elapsed time from the start point in time T11 increases during a period from the start point in time T11 to the prescribed point in time T13. For example, the target braking power BPTr is increased at a constant rate during the period from the start point in time T11 to the prescribed point in time T13. That is, the target braking power BPTr is derived so that the value becomes large in each period of time shorter than the prescribed time TMA.

Then, the target setting unit 384 acquires the target braking power BPTr corresponding to the elapsed time from the start of the braking operation from the changing profile BPPr, and outputs the acquired target braking power BPTr to the brake controller 39.

Figure 6:
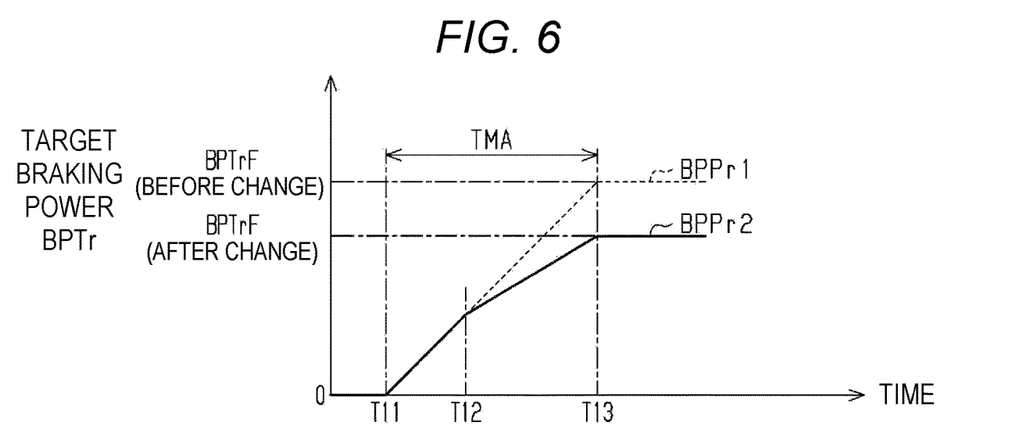
FIG. 6 is a graph illustrating an example of a changing profile of the target braking power from the start point in time of the braking operation until the prescribed time passes.

As described above, the stroke amount SS may be held or decreased during the period from the start point in time T11 to the prescribed point in time T13. As the final target braking power BPTrF is decreased in this case, the brake controller 39 re-creates the changing profile BPPr. In FIG. 6, a changing profile BPPr1 before re-creation is illustrated by a broken line and a changing profile BPPr2 after re-creation is illustrated by a solid line.

As illustrated in FIG. 6, the targe braking power BPTr at the prescribed point in time T13 is set to the same value as the final target braking power BPTrF obtained after decrease. In a case where a point in time when increase or decrease in the stroke amount SS is detected is set to a re-created point in time T12, the target braking power BPTr is set so that the value becomes large as the elapsed time from the re-created point in time T12 increases during a period from the re-created point in time T12 to the prescribed point in time T13. In the example illustrated in FIG. 6, the increase rate of the target braking power BPTr obtained after the re-created point in time T12 is lower than the increase rate of the target braking power BPTr obtained before the re-created point in time T12.

Next, operation and effect of the embodiment will be explained with reference to FIGS. 7A to 7C. In FIG. 7C, a transition of a target braking power BPTrA in a comparison example in which the target braking power BPTrA is set based on the operating force PF is illustrated by a broken line. In the comparison example, the target braking power BPTrA is set so that a value becomes large as the operation force PF increases.

Figure 7A:
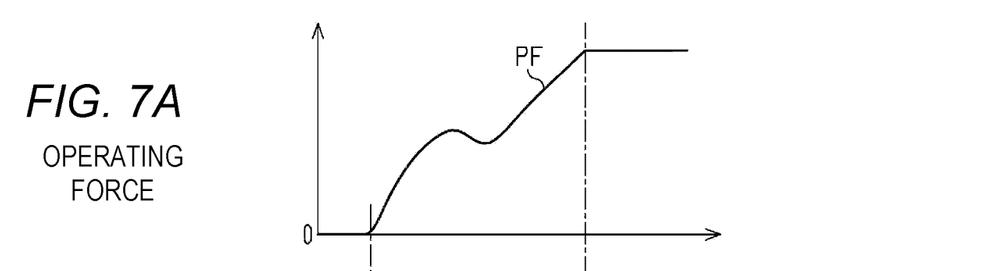
FIGS. 7A to 7C are timing charts obtained when the braking operation is executed.
Figure 7B:
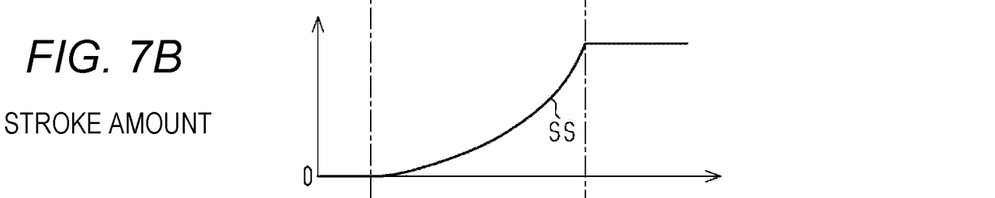
Figure 7C:
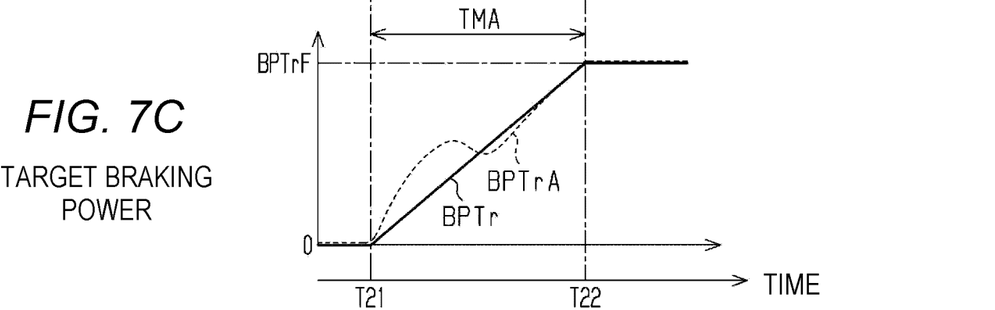

As illustrated in FIGS. 7A, 7B, and 7C, when the braking operation by the driver is started at a timing T21, both the operating force PF and the stroke amount SS begin to increase. Then, the prescribed time TMA and the final target braking power BPTrF are derived based on the increase state of the operating force PF and the increase state of the stroke amount SS at the start point in time of the braking operation. That is, the prescribed time TMA and the final target braking power BPTrF are derived based on the first product PR1 which is the product of the operating force PF and the operating-force increase rate VPF at the start point in time of the braking operation and the second product PR2 which is the product of the stroke amount SS and the stroke-amount increase rate VSS at the start point in time of the braking operation.

Here, when the operating force PF decreases though the stroke amount SS increases during the braking operation, the target braking power BPTrA decreases in the case of the comparison example. As a result, when the brake actuator 26 is operated based on the target braking power BPTrA, the vehicle braking power BP decreases though the stroke amount SS increases.

Concerning the above point, when the prescribed time TMA and the final target braking power BPTrF are derived at the timing T21 in the embodiment, the vehicle braking power BP is increased toward the final target braking power BPTrF during a period from the timing T21 to a timing T22. Accordingly, even when a phenomenon that the operating force PF decreases though the driver does not require the decrease in the vehicle braking power BP occurs, it is possible to suppress the decrease in the vehicle braking power BP against the intention of the driver during the period from the timing T21 to the timing T22. Therefore, it is possible to suppress the decrease in the vehicle braking power BP against the intention of the driver and suppress uncomfortable feeling to be given to the driver while the braking operation is executed.

The following effects can be further obtained according to the embodiment.

(1) When the driver needs sudden braking, the first product PR1 and the second product PR2 become large as the operating-force increase rate VPF and the stroke-amount increase rate VSS are high; therefore, the vehicle braking power BP can be increased immediately to the final target braking power BPTrF in the embodiment. Accordingly, variation in deceleration of the vehicle can be adjusted according to the intention of the driver.

(2) There is a case where the stroke amount SS is not increased while the vehicle braking power BP increases toward the final target braking power BPTrF. In this case, it can be assumed that the driver does not desire increase in the vehicle braking power BP from that point of time. Accordingly, in the case where the stroke amount SS is held or decreased prior to the point in time when the prescribed time TMA passes from the start of the braking operation, the final target braking power BPTrF is decreased in the embodiment. When the final target braking power BPTrF is decreased in this manner, the vehicle braking power BP is adjusted to be approximated to the final target braking power BPTrF obtained after decrease. As a result, the deceleration of the vehicle can be adjusted according to the intention of the driver.

(3) Also in the embodiment, in the case where the increase in the operating force PF continues after the vehicle braking power BP reaches the final target braking power BPTrF, it can be assumed that the driver further desires to increase the deceleration of the vehicle. Accordingly, the vehicle braking power BP is increased to be higher than the final target braking power BPTrF in such case. As a result, the deceleration of the vehicle can be adjusted according to the intention of the driver.

The above embodiment can be achieved by modification described as follows. The above embodiment and the following modification examples can be achieved by being combined with each other in a scope not being technically inconsistent.

In the above embodiment, the prescribed time TMA and the final target braking power BPTrF are derived based on both of the increase state of the operating force PF at the start point in time of the braking operation and the increase state of the stroke amount SS at the start point in time. However, in a case where the prescribed time TMA and the final target braking power BPTrF are derived based on the increase state of the operating force PF at the start point in time of the braking operation, it is not necessary to consider the increase state of the stroke amount SS at the start point in time when deriving the prescribed time TMA and the final target braking power BPTrF.

On the other hand, in a case where the prescribed time TMA and the final target braking power BPTrF are derived based on the increase state of the stroke amount SS at the start point in time of the braking operation, it is not necessary to consider the increase state of the operating force PF at the start point in time when deriving the prescribed time TMA and the final target braking power BPTrF.

In a case where the first target braking power BPTr1 is derived in consideration of the operating force PF at the start point in time of the braking operation in the first reference target derivation unit 33, it is not necessary to consider the operating-force increase rate VPF at the start point in time when deriving the first target braking power BPTr1. In this case, the operating force PF at the start point in time of the braking operation corresponds to the "increase state of the operating force". On the other hand, in a case where the first target braking power BPTr1 is derived in consideration of the operating-force increase rate VPF at the start point in time of the braking operation, it is not necessary to consider the operating force PF at the start point in time when deriving the first target braking power BPTr1. In this case, the operating-force increase rate VPF at the start point in time of the braking operation corresponds to the "increase state of the operating force".

In a case where the second target braking power BPTr2 is derived in consideration of the stroke amount SS at the start point in time of the braking operation in the second reference target derivation unit 36, it is not necessary to consider the stroke-amount increase rate VSS at the start point in time when deriving the second target braking power BPTr2. In this case, the stroke amount SS at the start point in time of the braking operation corresponds to the "increase state of the stroke amount". On the other hand, in a case where the second target braking power BPTr2 is derived in consideration of the stroke-amount increase rate VSS at the start point in time of the braking operation in the second reference target derivation unit 36, it is not necessary to consider the stroke amount SS at the start point in time when deriving the second target braking power BPTr2. In this case, the stroke-amount increase rate VSS at the start point in time of the braking operation corresponds to the "increase state of the stroke amount".

The prescribed time TMA may be fixed to a value which is previously set. In this case, the prescribed time TMA may be, for example, equal to or more than twice as long as the control cycle for acquiring the operation value of the braking operation member.

The operation value sensor may be a sensor detecting a value relating to operation of the braking operation member other than the operating force PF and the stroke amount SS. For example, the operation value sensor may be a sensor detecting a pressure generated inside the master cylinder 23 in response to the braking operation. In this case, an increase state of the pressure generated inside the master cylinder 23 corresponds to the "increase state of the operation value"; therefore, the prescribed time TMA and the final target braking power BPTrF are derived based on the increase state of the pressure. In this case, the pressure generated inside the master cylinder 23 in response to the operation of the braking operation member corresponds to a correlation value of the operation force inputted to the braking operation member.

In the above embodiment, when the operating force PF is changed in the state where the vehicle braking power BP reaches the final target braking power BPTrF, the target braking power BPTr is changed in accordance with the change of the operating force PF. However, it is also preferable to use parameters relating to the braking other than the operating force PF for changing the target braking power BPTr in the state where the vehicle braking power BP reaches the final target braking power BPTrF. For example, when the stroke amount SS is changed in the state where the vehicle braking power BP reaches the final target braking power BPTrF, the target braking power BPTr may be changed in accordance with the change of the stroke amount SS.

In the example illustrated in FIG. 5, the target braking power BPTr is increased at the constant rate toward the final target braking power BPTrF. However, when the target braking power BPTr increases toward the final target braking power BPTrF, it is also preferable that the target braking power BPTr may be increased so that the increase rate of the target braking power BPTr changes in the middle of the increase. The changing profile BPPr may be one which represents transition of the target braking power BPTr in each period of time shorter than the prescribed time TMA. For example, the changing profile BPPr may be one representing transition of the target braking power BPTr in plural periods of time with different lengths of time respectively. Moreover, a plurality of maps corresponding to the changing profiles BPPr may be stored in a not-illustrated storage unit in advance. In this case, the brake control device 30 selects a suitable map from the plural maps in accordance with the increase state of the operation values of the brake pedal 22.

The operation value sensor may be a sensor detecting a correlation value of the operating force PF as a parameter relating to the braking operation.

Members other than the brake pedal 22 may be used as the braking operation members as long as the members can be operated by the driver. For example, a brake lever, a switch and the like can be cited as the braking operation members other than the brake pedal 22. For example, the brake lever is configured to turn about a fixed position as a pivot; therefore, a force inputted for turning the brake lever corresponds to an operation value. Moreover, a turned amount of the brake lever corresponds to an operation amount. As the switch is configured to be operated by a pressing action, a pressing force inputted to the switch corresponds to an operation value.

In the above embodiment, when the stroke amount SS is held or decreased before the prescribed time TMA passes from the start of the braking operation, decreasing control that decreases the final target braking power BPTrF is executed. Whether the decreasing control is executed or not may be determined based on to what degree the stroke amount is decreased. For example, it is also preferable that the decreasing control is executed in a case where a decreased amount of the stroke amount SS reaches a prescribed decreased amount before the braking power BP reaches the final target braking power BPTrF. In this case, the decreasing control is not executed when the decreased amount is smaller than the prescribed decreased amount though the stroke amount SS is decreased. It is also preferable that the decreasing control is executed in a case where a length of a decreasing duration as a duration during which the stroke amount SS continues to be decreased reaches a predetermined length. For example, the decreasing control may be executed when the stroke amount is continuously decreased for a period corresponding to a plurality of control cycles. Furthermore, the decreasing control may be executed when the decreased amount is equal to or more than a prescribed decreased amount as well as the length of the decreasing duration reaches the predetermined length.

The invention claimed is:

1. A vehicle brake device comprising:
a first acquisition unit configured to acquire an operating force or a correlation value thereof inputted to a braking operation member as a first operation value, which is a first value relating to an operation of the braking operation member of a vehicle in each control cycle;
a second acquisition unit configured to acquire an operation amount of the braking operation member as a second operation value, which is a second value relating to the operation of the braking operation member of the vehicle in each control cycle;
a target derivation unit configured to derive a final target braking power, which is a target of a braking power at a point in time when a prescribed time longer than the control cycle passes from a start of the operation of the braking operation member, based on a first product and a second product when the operation of the braking operation member is started, the first product being a product of the operating force or the correlation value and an increase rate of the operating force or the correlation value, the second product being a product of the operation amount and an increase rate of the operation amount; and
a brake controller configured to control the vehicle braking power based on the target braking power so as to increase the vehicle braking power toward the final target braking power,
wherein the target derivation unit derives a target braking power so that a value becomes larger in each period of time shorter than the prescribed time based on the first product, the second product and the final braking power when the operation of the braking operation member is started.

2. The vehicle brake device according to claim 1, wherein
the target derivation unit executes decreasing processing that decreases the final target braking power when the operation amount is held or decreased while the vehicle braking power increases toward the final target braking power, and
the brake controller changes the vehicle braking power toward the final target braking power obtained after decrease when the final target braking power is decreased by the decreasing processing.

3. The vehicle brake device according to claim 1, wherein the target derivation unit derives the target braking power so that a value becomes larger in each period of time shorter than the prescribed time based on one of the operating force, the correlation value and the operation amount when the operating force or the correlation value increases after the vehicle braking power reaches the final target braking power.

* * * * *